United States Patent
Cartwright et al.

(10) Patent No.: US 10,789,952 B2
(45) Date of Patent: Sep. 29, 2020

(54) VOICE COMMAND EXECUTION FROM AUXILIARY INPUT

(71) Applicant: Microsoft Technology Licensing, LLC, Redmond, WA (US)

(72) Inventors: Luke Cartwright, Seattle, WA (US); Richard William Neal, Bellevue, WA (US); Alton Kwok, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/228,628

(22) Filed: Dec. 20, 2018

(65) Prior Publication Data

US 2020/0202849 A1 Jun. 25, 2020

(51) Int. Cl.
| | |
|---|---|
| *G06F 3/01* | (2006.01) |
| *G06F 1/16* | (2006.01) |
| *G10L 21/06* | (2013.01) |
| *G10L 15/22* | (2006.01) |
| *G10L 15/14* | (2006.01) |
| *G10L 15/18* | (2013.01) |

(52) U.S. Cl.
CPC .............. *G10L 15/22* (2013.01); *G06F 3/013* (2013.01); *G10L 15/14* (2013.01); *G10L 15/1815* (2013.01); *G10L 2015/223* (2013.01); *G10L 2015/226* (2013.01)

(58) Field of Classification Search
CPC ............... G10L 21/06; G06F 3/01; G06F 1/16
See application file for complete search history.

(56) References Cited

U.S. PATENT DOCUMENTS

| | | | |
|---|---|---|---|
| 8,419,545 | B2 | 4/2013 | Yen et al. |
| 9,013,264 | B2 | 4/2015 | Parshionikar et al. |
| 9,423,870 | B2 | 8/2016 | Teller et al. |
| 9,451,210 | B1 | 9/2016 | Smus |
| 10,048,856 | B2 | 8/2018 | Vranjes et al. |
| 2013/0342672 | A1 | 12/2013 | Gray et al. |

(Continued)

OTHER PUBLICATIONS

Turk, et al., "Gesture Recognition", Retrieved from: https://pdfs.semanticscholar.org/502d/93022bc68f42a74e1442ade8c9320d954aae.pdf , Oct. 15, 2018, 14 Pages.

(Continued)

*Primary Examiner* — Shreyans A Patel
(74) *Attorney, Agent, or Firm* — Alleman Hall Creasman & Tuttle LLP

(57) ABSTRACT

A computing system is provided. The computing system includes a processor of a display device configured to execute one or more programs. The processor is configured to receive, from a user, a voice command, a first auxiliary input from a first sensor, and a second auxiliary input from a second sensor. The processor is configured to, for each of a plurality of objects in the user's field of view in an environment, determine a first set of probability factors with respect to the first auxiliary input and a second set of probability factors with respect to the second auxiliary input. Each probability factor in the first and second sets indicates a likelihood that respective auxiliary inputs are directed to one of the plurality of objects. The processor is configured to determine a target object based upon the probability factors and execute the command on the target object.

20 Claims, 8 Drawing Sheets

(56) References Cited

U.S. PATENT DOCUMENTS

| | | | | |
|---|---|---|---|---|
| 2014/0267400 A1* | 9/2014 | Mabbutt | ................. | G06F 1/163 |
| | | | | 345/633 |
| 2014/0350942 A1* | 11/2014 | Kady | ..................... | G06F 3/013 |
| | | | | 704/275 |
| 2014/0361988 A1* | 12/2014 | Katz | ....................... | G06F 3/012 |
| | | | | 345/156 |
| 2015/0331490 A1 | 11/2015 | Yamada | | |
| 2016/0162020 A1* | 6/2016 | Lehman | ................. | G06F 3/017 |
| | | | | 715/835 |
| 2017/0358141 A1* | 12/2017 | Stafford | ............... | G02B 27/017 |
| 2018/0046851 A1 | 2/2018 | Kienzle et al. | | |
| 2018/0307303 A1* | 10/2018 | Powderly | ................ | G06F 1/163 |
| 2019/0236416 A1* | 8/2019 | Wang | ................... | G06K 7/1417 |
| 2020/0019236 A1* | 1/2020 | Parkinson | ............... | G06F 3/013 |

OTHER PUBLICATIONS

"International Search Report and Written Opinion Issued in PCT Application No. PCT/US19/066108", dated Mar. 16, 2020, 12 pages.

\* cited by examiner

VOICE COMMAND EXECUTION FROM AUXILIARY INPUT

BACKGROUND

Augmented reality (AR) and virtual reality (VR) environments may present an array of virtual objects to a viewer. An AR or VR system may be designed to receive different types of input from a user as well as respond to the user's input. For example, eye-tracking and gesture recognition have become part of many AR/VR device capabilities. Depending on the system, a user of an AR/VR device may be offered a variety of ways with which to interact with the virtual objects and real objects recognized by the system, whether by way of natural language input, gaze, gestures, and/or haptic responses. Object that are the focus of a user's interest should respond accordingly in a way a user expects. One challenge for current AR/VR systems is to properly interpret the user's input as the user attempts to interact with the real and virtual objects in the AR/VR environment.

SUMMARY

A computing system is provided. The system may include a processor of a display device configured to execute one or more programs. The processor may be configured to receive a voice command from a user and to receive a first auxiliary input from the user from a first sensor and a second auxiliary input from the user from a second sensor. The processor may be further configured to determine a first set of probability factors for each of a plurality of objects in the user's field of view in an environment with respect to the first auxiliary input from the user and a second set of probability factors for each of the plurality of objects with respect to the second auxiliary input from the user, each probability factor in the first and second sets indicating a likelihood that respective auxiliary inputs are directed to a respective one of the plurality of objects. The processor may be further configured to determine a target object from among the plurality of objects based upon the probability factors of the first and second auxiliary inputs and execute the command on the target object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Augmented reality (AR) and virtual reality (VR) systems continue to expand in their areas of application, with technological improvements at times opening new possibilities for user experiences. Within this evolving field is an effort to improve user interaction with AR/VR environments. One way in which user interaction may be improved is by offering a user the ability to communicate with an AR/VR system using natural language input. Enabling the user to speak vocal commands to the AR/VR system, for example, can free the user's hands for other tasks, such as forming gesture commands, within the AR/VR environment.

The inventors have recognized that one particular problem in the area of natural language processing may be determining which entities or objects in an AR/VR environment are the intended targets of voice commands from the user. An AR/VR system may accept other forms of input from the user, such as gaze and gesture input, concurrently or close in time to receiving the voice commands; this input may facilitate determining to which entity or object the user is directing a command within the AR/VR environment. Designing a system to accurately interpret non-semantic input that may include voice volume or voice inflection in addition to pose and gesture data may be of benefit to deciphering voice command intention.

In consideration of these challenges, the inventors have conceived of a computing system that may implement assignment of weights and/or probabilities to objects in an AR/VR environment from auxiliary input from the user as one approach to solving the problem of determining user intention. The AR/VR system may be configured to determine a set of possible targets for a user's command from which a likeliest target object may be chosen. Additionally, when integrating a machine learning model or artificial intelligence with an AR/VR system, input received from the user may be supplied to train the machine learning model such that interpreting the user's actual intention may be learned and applied to modeling future interactions with the user. Specific example implementations of this general approach are discussed further below.

Figure 1:
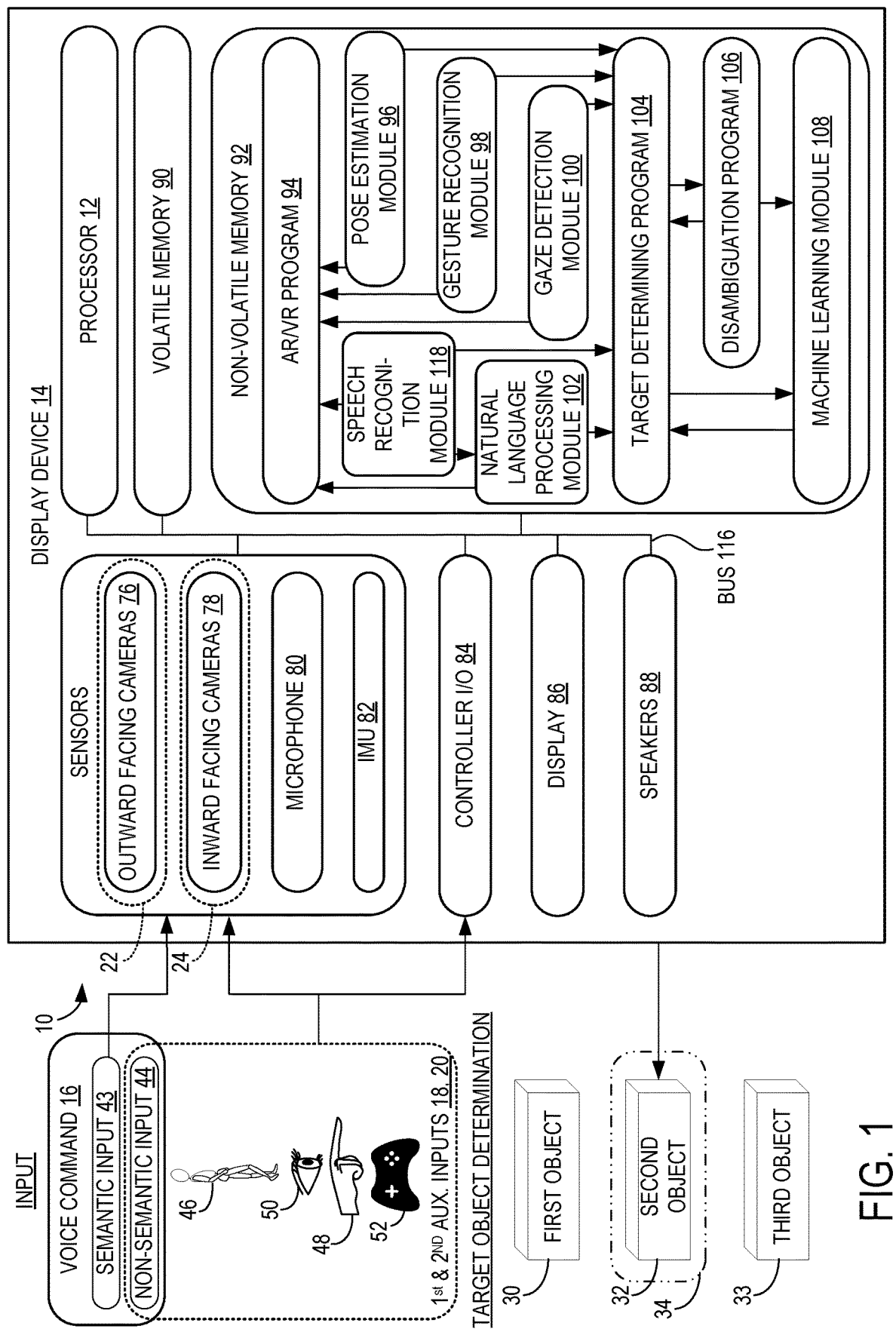
FIG. 1 shows a computing system according to an example implementation of the present disclosure.

FIG. 1 shows a computing system 10 according to an example implementation of the present disclosure. The computing system 10 may include a processor 12 of a display device 14 configured to execute one or more programs. The display device 14 may include volatile memory 90 that the processor 12 may use while executing the programs and non-volatile memory 92 for storage of the programs. For example, stored in non-volatile memory 92 may be an AR/VR program 94, a target determining program 104, a disambiguation program 106, and a machine learning (ML) module 108. The AR/VR program 94 may exchange data with the target determining program 104. The ML module 108 may execute a machine learning model 54 and exchange data with the target determining program 104 and the disambiguation program 106 as described below. The non-volatile memory 92 may also store a speech recognition module 118, a natural language processing (NLP) module 102, a pose estimation module 96, a gesture recognition module 98, and a gaze detection module 100. The speech recognition module 118 may process speech input such as voice commands 16 and relay vocal user input data to the AR/VR program 94 and target determining program 104.

Similarly, the NLP module 102 may receive input from the speech recognition module 118 and send data to the AR/VR program 94 and the target determining program 104. It will be appreciated that the recognized speech input is typically an array of tokenized text strings. The NLP module 102 receives the recognized speech input from the speech recognition module 118, and processes the recognized speech input by segmenting sentences, tagging parts of speech, and extracting commands 16 and names of objects associated with the commands 16. If the NLP module 102 detects natural language input including a recognizable command 16 (such as "open," "close," etc.) the NLP module 102 attempts to also detect a name of a target object 34 to which the command 16 is to be applied. However, the NLP module 102 is a statistical machine translation model, and thus the model's confidence with regard to the detection of a command 16 and/or entity name of an object associated with the command 16 has an associated confidence value.

Also exchanging data with the AR/VR program 94 and target determining program 104 may be the gaze detection module 100, which may be configured to process image data collected by inward facing cameras 78, discussed below, to identify the position and orientation of each of a user's eyes and subsequently generate eye-tracking data. The pose estimation module 96 and gesture recognition module 98 may be configured to identify poses and gestures expressed by the user by processing image data of the user collected by outward facing cameras 76, also discussed below, when these cameras capture images of the user's body or portions thereof, such as the user's hands.

Also included in the display device 14 may be a plurality of sensors of various types. The sensors may include the outward facing cameras 76 discussed above and the inward facing cameras 78 discussed above, which are configured as eye trackers that track the gaze direction of the user's eyes. The sensors may further include a microphone 80 and an inertial measurement unit (IMU) 82, which in turn may include accelerometers, gyroscopes and/or a compass that can detect, for example, a 6 degree of freedom (6DOF) position and orientation of the display device. The processor 12 may further refine the 6DOF output of the IMU 82 using visual tracking systems that search for movement of identified visual features in a series of images captured by the outward facing cameras and generate an estimate of the relative movement of the display device 14 based upon the movement of these visual features within successive image frames captured by the outward facing cameras over time. The microphone 80 or one or more of the cameras 76, 78 may be integrated with the display device 14, or provided separately therefrom. The display device 14 may be configured to receive input from an external controller 52, and accordingly controller input/output software 84 may also be included. A display 86 may be integrated with the display device 14, or optionally provided separately. Speakers 88 may be included in the display device 14, or also provided separately. It will be appreciated that these components may be connected via a data bus 116.

Figure 2:
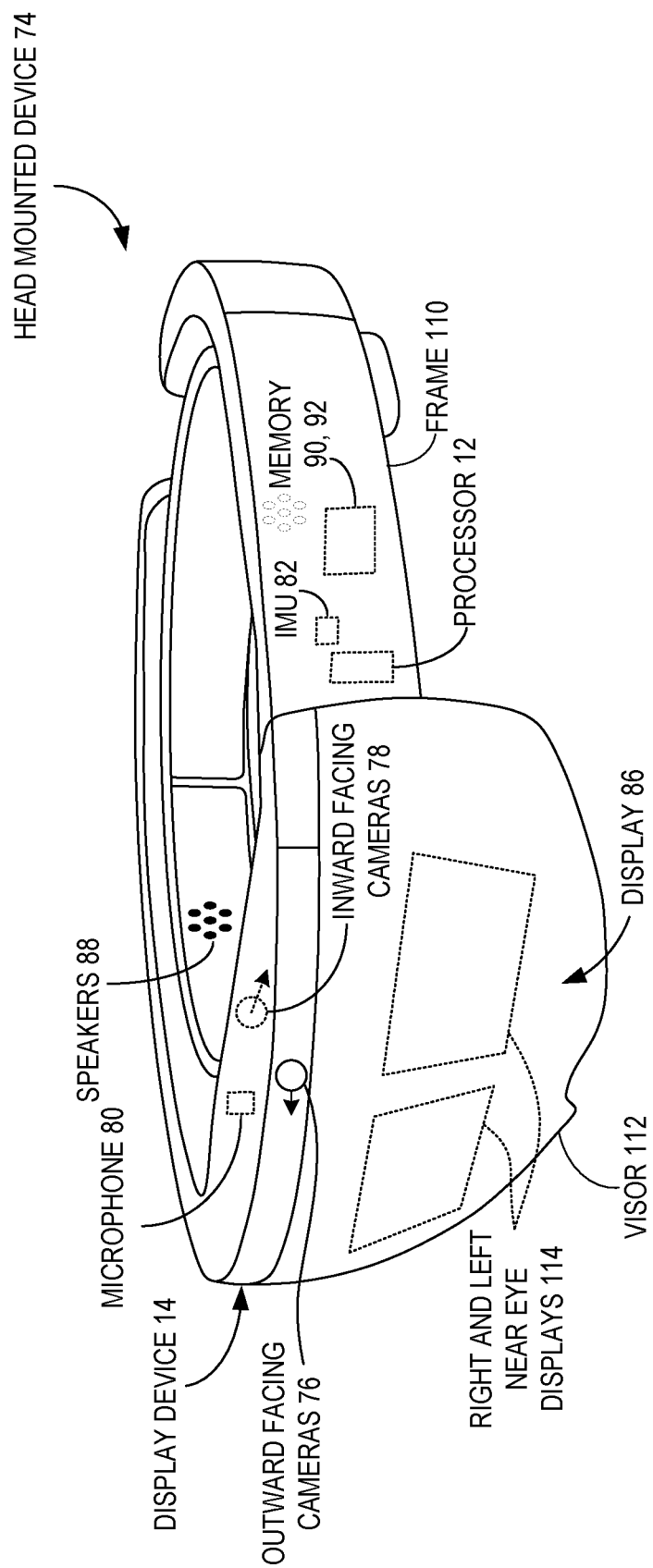
FIG. 2 is an example implementation of the computing system of FIG. 1 in a display device that is embodied in a head mounted device.

As shown in FIG. 2, display device 14 may be embodied in a head mounted device 74. The processor 12, volatile and non-volatile memories 90, 92, outward facing cameras 76, inward facing cameras 78, microphone 80, IMU 82, and speakers 88 may be incorporated within a housing of the head mounted device 74 as shown. The head mounted device 74 may include a frame 110 that at least partially encircles the head of a user, and the display 86 may include a pair of right and left near-eye displays 114. The near-eye displays 114 may be positioned behind a visor 112 through which a user may observe the physical surroundings in an AR system. It will be appreciated that the near eye displays 114 and visor 112 are at least partially transparent, enabling the user to see through these components to view the real environment, at least when content is not opaquely displayed on the near-eye displays 114.

Returning to FIG. 1, the processor 12 may be configured to receive a voice command 16 from a user by way of natural language input. The voice command 16 may be received via the microphone 80 of the display device 14. Included in the voice command 16 may be semantic input 43, i.e., the words having meaning within the command 16, and non-semantic input 44, which may include intonation, voice volume, and other vocal inputs apart from the actual words having semantic meaning in the command 16. The processor 12 may be configured to, from input from the sensors, receive a first auxiliary input 18 from the user from a first sensor 22 and a second auxiliary input 20 from the user from a second sensor 24. Each of the first auxiliary input 18 and the second auxiliary input 20 may include one or more of non-semantic input 44 of the command 16, one or more poses 46 of the user, a gesture 48 of the user, gaze direction 50 of the user, and controller input of a controller 52 operated by the user, such as a game controller.

The auxiliary inputs 18, 20 may accompany the command 16. For example, the user may give the command "Move that to the left" while facing a particular direction and gesturing toward a region that includes several objects in an AR/VR environment. In this example, the command 16 includes the semantic input 43 of the words "Move that to the left" in addition to the auxiliary inputs 18, 20 of the direction the user's body is facing, or pose 46, and the gesture 48. It will be appreciated that multiple auxiliary inputs in addition to the first and second auxiliary inputs 18, 20 may be recognized by the system 10 as accompanying command 16. That is, one or more of a pose 46, gesture 48, gaze direction 50, controller input 52, and non-semantic input 44 such as voice volume may be received by the system 10 as associated with a particular command 16.

Figure 3:
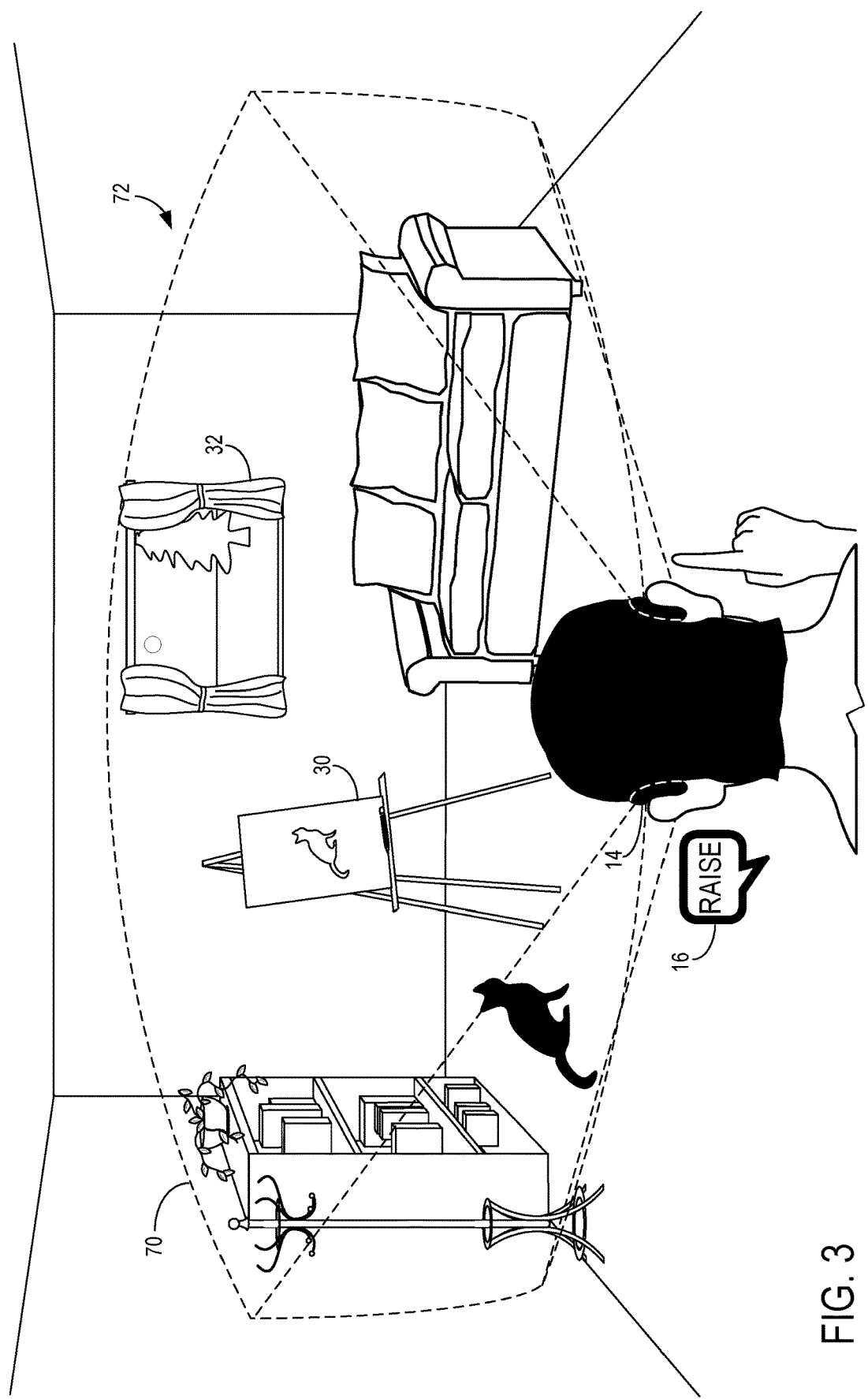
FIG. 3 shows an augmented reality environment viewed using the computing system of FIG. 1, according to one example of the present disclosure.

The system 10 may identify a plurality of objects in an AR/VR environment to which a user's command 16 may apply. FIG. 3 shows a user in an AR environment 72 that includes real objects such as a couch and bookshelf as well as an AR drawing program and a virtual window. A target object 34 from among the plurality of objects may be an object the user is indicating with the command 16; the target object 34 may be a virtual object or real object. For example, if the user issues the command "Dim" while using a display device 14 for an AR environment, the system 10 may determine that "Dim" may mean to dim the illuminance of a virtual object being displayed to the user or, if the AR system is integrated with smart home devices, the user may mean that the lights in the room are to be dimmed.

With reference to FIG. 3, the user issues the command "Raise". The system 10 may identify that a virtual window and a canvas of an AR drawing program are both objects that may be raised. In FIG. 3, a plurality of objects are identified by the system as being capable of receiving the command 16. The canvas of the AR drawing program is labeled as a first object 30 and a second object 32 is the virtual window.

While FIG. 3 illustrates a first and second object 30, 32, it will be appreciated that other objects may also be identified. For example, FIG. 1 shows a first object 30, a second object 32, and a third object 33 that may be included in a plurality of objects identified by the system as capable of receiving the command 16.

Figure 4:
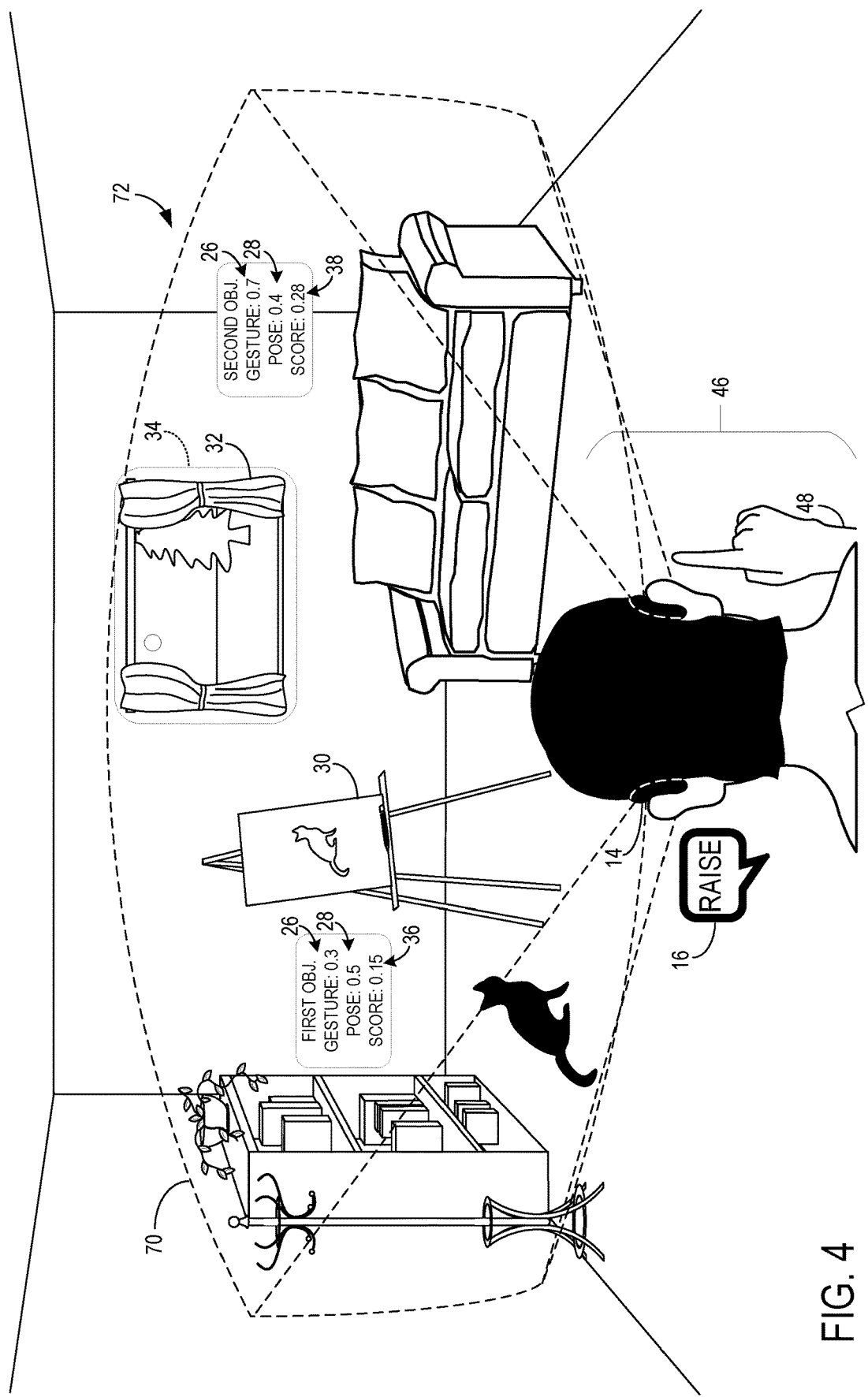
FIG. 4 shows an augmented reality environment viewed using the computing system of FIG. 1, according to another example of the present disclosure.

Turning now to FIG. 4, the processor 12 may be configured to determine a first set of probability factors 26 for each of the plurality of objects in the user's field of view 70 in the environment 72. The first set of probability factors 26 may be determined with respect to the first auxiliary input 18 from the user. A second set of probability factors 28 for each of the plurality of objects may be determined with respect to the second auxiliary input 20 from the user. Each probability factor 26, 28 in the first and second sets may indicate a likelihood that respective auxiliary inputs 18, 20 are directed to a respective one of the plurality of objects. FIG. 4 shows that the system 10 has determined probability factors 26 and 28 with respect to each of the objects 30, 32. In this example, the auxiliary inputs 18, 20 are a pose 46 and a gesture 48. For first object 30, the system determines that the gesture 48 indicates the first object 30 at an example probability of 0.3, while the second object 32 is indicated by the gesture 48 at an example probability of 0.7. Similarly, the first object 30 is indicated by the pose 46 at an example probability of 0.5 and the second object is indicated by the pose 46 at an example probability of 0.4. As discussed above, it will be appreciated that the auxiliary inputs 18, 20, may be only two of a larger number of auxiliary inputs, each of which may be applied to determine a respective probability factor for each one of many objects that the system 10 identifies as potentially receiving the command 16 of the user.

Continuing with FIG. 4, the processor 12 may be configured to determine a target object 34 from among the plurality of objects, based upon the probability factors 26, 28 of the first and second auxiliary inputs 18, 20. Determining the target object 34 may include computing a probability score for each of the plurality of objects by multiplying a respective first probability factor 26 by a respective second probability factor 28. Returning briefly to FIG. 1, second object 32 is indicated in FIG. 1 by a dot-dot-dash line to be the target object 34 as determined by the system 10. Returning to FIG. 4, this figure shows one example of how the target object can be determined, namely, that the first probability factor 26 for each object can be multiplied by the second probability factor 28 for each object to compute a first probability score 36 and a second probability score 38 for the first object 30 and the second object 32, respectively. For first object 30, the first probability score 36 is equal to the first probability factor 26 for gesture 48 that is equal to 0.3 multiplied by the second probability factor 28 for pose 46 that is equal to 0.5, making first probability score 36 equal to 0.15. A similar calculation for the second object 32 results in a second probability score 38 equal to 0.28. An object with the highest probability score of the probability scores 36, 38 may be chosen as the target object 34 from among the plurality of objects. In FIG. 4, the second object 32 has the higher probability score at 0.28, therefore the virtual window is selected by the system 10 as the target object 34 as indicated with the dotted line.

Figure 5:
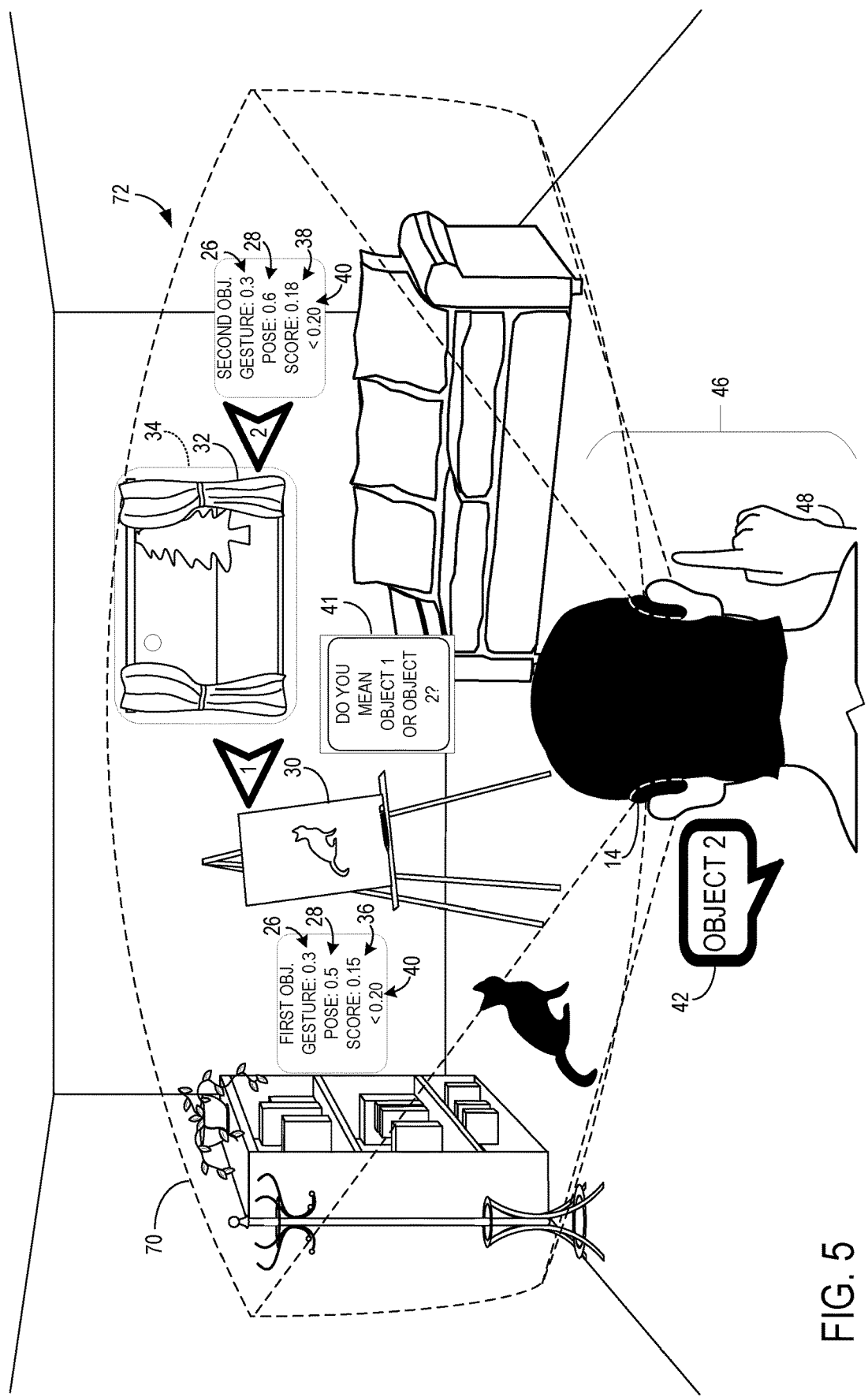
FIG. 5 shows an augmented reality environment viewed using computing system of FIG. 1, according to another example of the present disclosure.

Turning now to FIG. 5, of the first and second objects 30, 32, the object with the highest probability score may be chosen as the target object 34 when the highest probability score is above a predetermined confidence threshold 40 above which the voice command 16 is deemed to be sufficiently associated with an object for identification as the target object 34. Determining the target object 34 may further include the processor 12 being configured to, when the highest probability score is below the predetermined confidence threshold 40, query the user for a disambiguation input 42 indicating the target object 34. FIG. 5 shows an example where the first probability score 36 for the first object 30 is equal to 0.15, and the second probability score 38 for the second object 32 is equal to 0.18. In this case, the system includes a predetermined confidence threshold 40 that is equal to 0.20. Since both first and second probability scores 36, 38 are below 0.20, neither first object 30 nor second object 32 is deemed to be sufficiently associated with the command 16 and thus neither object is determined to be the target object 34 by the system 10. It will be appreciated that other approaches to determining whether an object is sufficiently associated with the command 16 may be applied. For example, the system 10 may determine that the probability scores 35, 38 are too similar when they are less than 0.05 units apart in value and thus a target object 34 in such a case may be indeterminable.

Given the processing of a plurality of auxiliary inputs 18, 20 to determine the target object 34, it may be that one or more auxiliary inputs 18, 20, such as gaze direction 50, may be excluded from the determination of probability factors 26, 28. One potential advantage of this configuration is that processing power of the computing system 10 may be reduced, and/or sensor data gathering from the user may be made more efficient and/or more streamlined. This may be especially true when a machine learning model 54 is incorporated into the system 10 as described below, for the system 10 may be enabled to determine target objects 34 by relying on some auxiliary inputs 18, 20 more than others. Additionally, the system 10 may incorporate various sensors that require differing levels of power input. The system 10 may power-down some sensors that are costlier in terms of power when the command 16 is correctly associated with a target object 34 the majority of the time using more power-efficient sensors. That is, if sensors are estimated to be inefficient at disambiguation between two or more types of candidate objects, then those sensors may be powered down when only said types of candidate objects are in the environment 72.

The processor 12 may be configured to prioritize each of the first and second auxiliary inputs 18, 20 from the user according to a context associated with the environment 72. For example, if the user is currently engaged in a game and issues the command "Save", the system 10 may determine that the game, game level, or virtual objects within the game are likelier potential targets of the user's command 16 than non-game-related objects and therefore may prioritize gestures 48 and controller input from a controller 52. Alternatively, if the user is currently composing a grocery list while using the AR system in a kitchen and issues the command "Save", the system 10 may determine that the user is likelier to be referring to an object in the kitchen or possibly the grocery list file, and thus may prioritize gaze direction 50 over pose 46 and other auxiliary inputs.

Given the target object 34 being indeterminable by the system 10, a disambiguation input 42 may therefore be requested by the system 10, which may issue a query 41 to the user of, "Do you mean object 1 or object 2?" In FIG. 5, the first and second objects 30, 32 are indicated as objects 1 and 2, respectively, by arrowhead indicators. It will be appreciated that the query 41 may be presented via text shown in the user's field of view 70 as depicted in FIG. 5 or via a synthesized voice issued through the speakers 88. The user may respond to the query 41 with disambiguation input 42. In FIG. 5, the user vocally indicates that object 2, or the second object 32, is the target object 34. It will be appreciated that the disambiguation input 42 may be a gesture 48, gaze direction 50, controller input from controller 52, and/or any other available user input that the system 10 is configured to recognize. Regardless of the type of user input, the disambiguation input 42 may be processed by the system 10 to determine which object is being indicated by the user as the target object 39. Once the target object 34 is determined, the processor 12 may be configured to execute the command 16 on the target object 34.

Each of the first and second probability factors 26, 28 may be determined from weights W assigned to each auxiliary input type, where a first auxiliary type includes first auxiliary input 18 and a second auxiliary type includes second auxiliary input 20. For example, if the first auxiliary input 18 is eye movement, then the first auxiliary type is gaze direction 50.

The weights W may be determined prior to receiving the voice command 16 from the user and may be assigned by at least one method including calculating weights W based on experimental data from a sample of users, assignment of weights W heuristically, and training a machine learning model 54 on a training data set 56 to determine weights W.

When using experimental data from a sample of users, a large sample of users may be monitored while using system 10. Non-semantic inputs 44, poses 46, gestures 48, and gaze direction 50 may be grouped and ranked in terms of importance when members of the large sample of users interact with objects in the system 10. For example, it may be that gestures 48 are assigned weights W with higher numerical values than poses 46 if the gestures 48 in the experimental data play a more important role in determining a target object 34 than other auxiliary input from the users.

Alternatively, when using heuristics, the developers of system 10 may simply assign weights W to auxiliary input types heuristically, by making educated guesses about the relative importance of the auxiliary input types or possibly on the basis of what a given system 10 is able to compute with the most certainty or efficiency.

Figure 6:
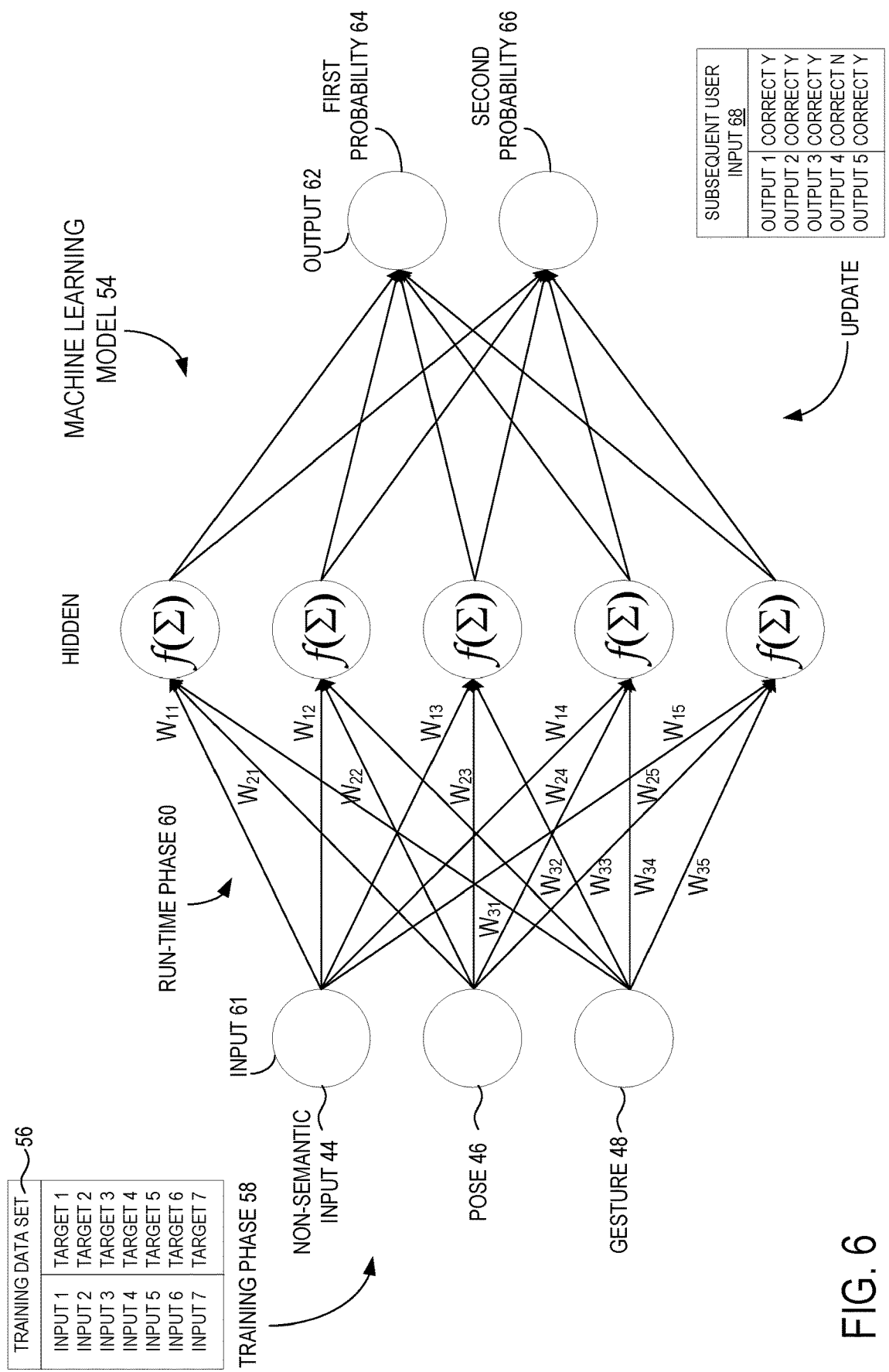
FIG. 6 is a schematic depiction of a machine learning model for use with the computing system of FIG. 1, according to one example of the present disclosure.

Referring to FIG. 6, when using machine learning model training, machine learning model 54 may be trained to assign weights W to auxiliary input types. Training of the machine learning model 54 may be realized through the use of a deep learning neural network with an input layer receiving input 61, an output layer generating output 62, and multiple hidden layers therebetween. Training the machine learning model 54 may be executed with a training data set 56 to determine weights W in a training phase 58 prior to receiving the voice command 16 from the user. The training data set 56 may include paired input-output data, including auxiliary inputs and voice command inputs paired with user selected target objects. A predetermined scale may be created where the relative importance of auxiliary inputs such as pose 46, gesture 48, gaze direction 50 and the like is represented in the numerical values of the predetermined scale. Thus, an initial set of weights W may be included for the inputs 61 so that the combined input of auxiliary inputs may be weighted according to an initial standard in the machine learning model 54.

During the training phase 58, the training dataset 56 may be used to train the neural network. Backpropagation is used to adjust the weights W of the neural network so that the weights W between the nodes in the hidden layers are adjusted to reflect the inputs mapping to particular outputs. By training the neural network on large numbers of input-output pairs, the neural network can come to recognize patterns in the inputs. As shown in FIG. 6, non-semantic input 44 may be assigned weights $W_{11}$, $W_{12}$, $W_{13}$, $W_{14}$, and $W_{15}$, which may represent the relative importance of voice volume and pitch for an object that is far away in $W_{11}$ versus the relative importance of voice volume and pitch for an object that is close in $W_{12}$. Each auxiliary input type received by the neural net as input 61 has, therefore, associated weights representing the relative importance of the auxiliary input type to various objects 30, 32 that may receive the user's command 16.

Receiving the voice command 16 and first and second auxiliary inputs 18, 20, determining the first and second set of probability factors 26, 28, and determining the target object 34 may occur during a run-time phase 60 of the machine learning model 54. Determining the first and second sets of probability factors 26, 28 may include inputting the first and second auxiliary inputs 18, 20, respectively, into the trained machine learning model 54. In the example of FIG. 6, inputs 61 from the user include non-semantic input 44, pose 46, and gesture 48, although the inputs 61 may also include gaze direction 50, controller input from controller 52, or other auxiliary inputs 18, 20 that may be collected by the sensors. When presented with new inputs not in the training data set 56, the same patterns established during the training phase 58 may be recognized by the trained machine learning model 54 and an output 62 predicted. Thus, inputs 61 may be weighted and processed to determine the first probability 64 that first object 30 is the target object 34 and the second probability 66 that the second object 32 is the target object 34. A potential advantage of this configuration is that with repeated input 61 received into the machine learning model 54, probabilities 64, 66 of various objects being the target object 34 may be more rigorously established as the weights W are improved and the system 10 may execute commands 16 from the user on target objects 34 with greater accuracy.

Determining the target object 34 may include reading an output 62 of the trained machine learning model 54 that may indicate a probability 64, 66 for each of the plurality of objects for identification of the target object 34. For example, a first probability 64 of first object 30 and a second probability 66 of second object 32 are shown in FIG. 6 as an output 62 of the machine learning model 54. As described above, from these probabilities the system 10 may determine that the target object 34 is the object with the highest probability. If the first probability 64 and the second probability 66 are both below a predetermined confidence threshold 40, the system 10 may proceed to query the user for a disambiguation input 42 to determine the target object 34. The processor 12 may be configured to determine whether the target object 34 was correctly identified based on subsequent user input 68 and update the machine learning model 54 based on the subsequent user input 68. In the example of FIG. 6, a table is shown with five outputs where one of the outputs did not correctly indicate the target object 34. This may have been indicated by the user vocalizing, "No, I mean object one", for example.

Figure 7:
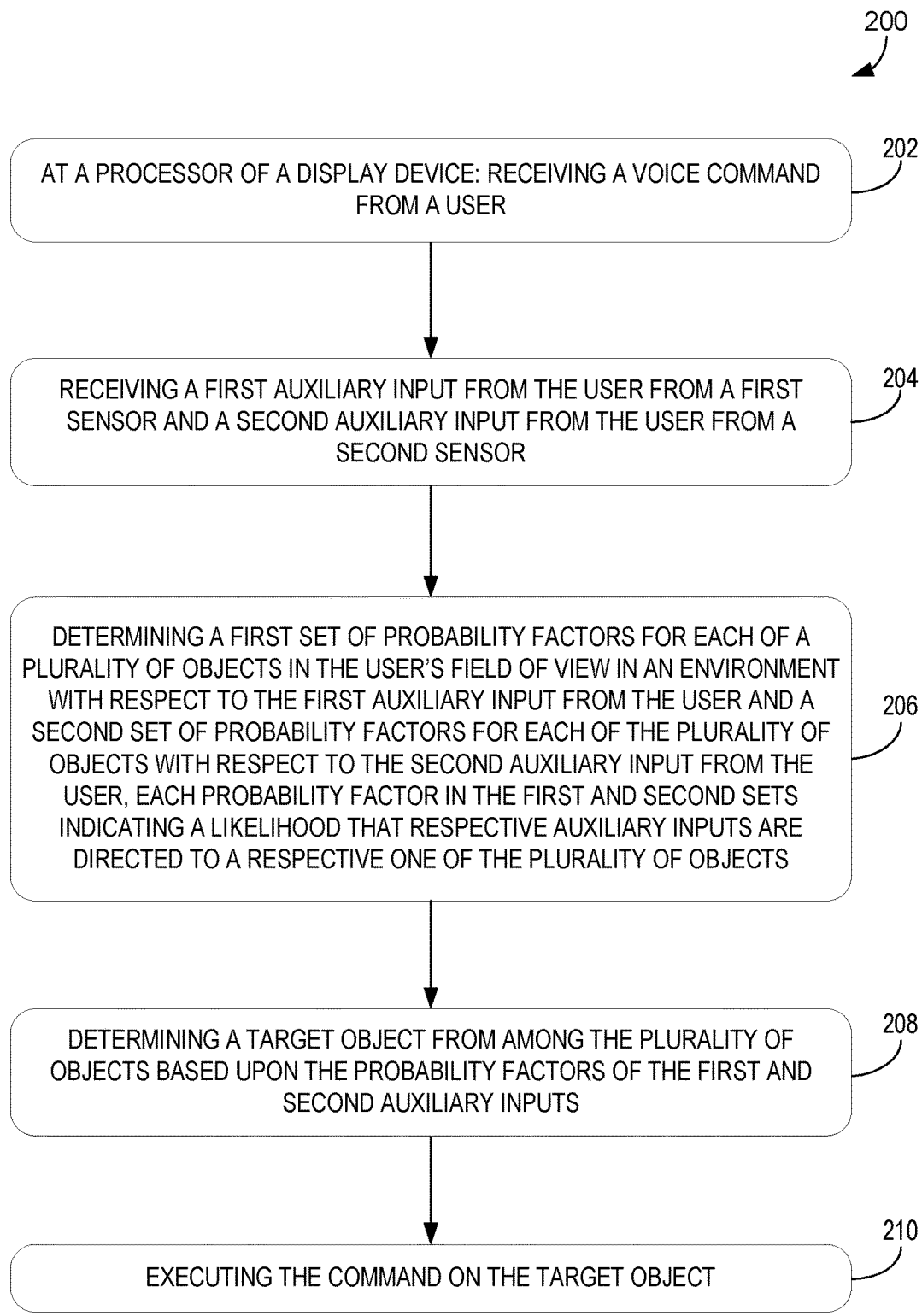
FIG. 7 is a flowchart of a method according to one implementation of the present disclosure.

FIG. 7 shows a flowchart of a method 200 for use with a computing device of the computing system 10. The following description of method 200 is provided with reference to the computing systems 10 described above and shown in FIG. 1. It will be appreciated that method 200 may also be performed in other contexts using other suitable components.

With reference to FIG. 7, the method 200 may be for use with a computing device. The method 200 at 202 may include, at a processor 12 of a display device 14, receiving a voice command 16 from a user. The voice command 16 may be by way of natural language input. The method 200 at 204 may include receiving a first auxiliary input 18 from the user from a first sensor 22 and a second auxiliary input 20 from the user from a second sensor 24. Each of the first auxiliary input 18 and the second auxiliary input 20 may include one or more of a non-semantic input 44 of the command 16, a pose 46 of the user, a gesture 48 of the user, a gaze direction 50 of the user, and a controller input of a controller 52 operated by the user. Non-semantic input 44 of the command 16 may include, for example, voice volume, intonation, voice cadence, and the like.

At 206, the method 200 may include determining a first set of probability factors 26 for each of a plurality of objects that may include a first object 30 and a second object 32 in the user's field of view 70 in an environment 72. The first set of probability factors 26 may be determined with respect to the first auxiliary input 18 from the user; a second set of probability factors 28 for each of the plurality of objects may be determined with respect to the second auxiliary input 20 from the user. Each probability factor in the first and second sets 26, 28 may indicate a likelihood that respective auxiliary inputs 18, 20 are directed to a respective one of the plurality of objects, including first and second objects 30, 32. Examples are given above, but to reiterate, a first object 30 may be indicated by gaze direction 50 at a probability of 0.7 but indicated by gesture 48 at a probability of 0.1. A second object 32 may be indicated by gaze direction 50 at a probability of only 0.2 but by gesture 48 at a probability of 0.8. The method 200 may also include prioritizing each of the first and second auxiliary inputs 18, 20 from the user according to a context associated with the environment 72.

At 208, the method 200 may include determining a target object 34 from among the plurality of objects, including first and second objects 30, 32, based upon the probability factors 26, 28 of the first and second auxiliary inputs 18, 20. The target object 34 may be a virtual object or real object. In the method 200, determining the target object 34 may include, as described above, computing a probability score for each of the plurality of objects, including first and second objects 30, 32, by multiplying a respective first probability factor 26 by a respective second probability factor 28 to compute a first probability score 36 and a second probability score 38. Thus, the influence of each auxiliary input may be considered in determining the overall strength of indication for each of the plurality of objects as the target object 34. Once the target object 34 is determined, the method 200 at 210 may include executing the command 16 on the target object 34.

As also described above, an object with a highest probability score may be chosen as the target object 34 from among the plurality of objects. The object with the highest probability score may be chosen as the target object 34 when the highest probability score is above a predetermined confidence threshold 40 above which the voice command 16 is deemed to be sufficiently associated with an object for identification as the target object 34. For example, three objects may have probability scores of 0.17, 0.24, and 0.26. If the predetermined confidence threshold 40 is 0.25, then the third object with the probability score of 0.26 would be selected by the system 10 as the target object 34. Determining the target object 34 may further include, when the highest probability score is below the predetermined confidence threshold 40, querying the user for a disambiguation input 42 indicating the target object 34. Regarding the three objects above, if the predetermined confidence threshold 40 includes that the highest probability score be at least 0.05 units higher than the second highest probability score, the system 10 may query the user for disambiguation input 42 directed to determining whether the second object or third object, with respective probability scores of 0.24 and 0.26, is the target object 34.

The method 200 may further include that each of the first and second probability factors 26, 28 may be determined from weights W assigned to each auxiliary input type prior to receiving the voice command 16 from the user. The first auxiliary type may include the first auxiliary input 18 and the second auxiliary type may include the second auxiliary input 20. For example, the first auxiliary type may include hand positions and hand movements regarded as being gestures 48, which may be assigned a particular weight representing its relative importance to indicating the target object 34. The weights W may be assigned by at least one method including calculating weights W based on experimental data from a sample of users, heuristic assignment of weights, and training a machine learning model 54 on a training data set 56 to determine weights W.

The method 200 may include, as described above, training the machine learning model 54 on a training data set 56 to determine weights W, which may be executed in a training phase 58 prior to receiving the voice command 16 from the user. The training data set 56 may include paired input-output data, including auxiliary inputs and voice command inputs paired with user selected target objects. As described above, an initial set of weights W may be included in the machine learning model 54, such that the training data set 56 refines the weights W as the machine learning model 54 learns how to correctly interpret auxiliary inputs 18, 20 from the user.

Receiving the voice command 16, first and second auxiliary inputs 18, 20, determining the first and second set of probability factors 26, 28, and determining the target object 34 may occur during a run-time phase 60 of the machine learning model 54. Determining the first and second sets of probability factors 26, 28 may include inputting the first and second auxiliary inputs 18, 20, respectively, into the trained machine learning model 54. Determining the target object 34 may include reading an output 62 of the trained machine learning model 54 that may indicate a probability 64, 66 for each of the plurality of objects for identification of the target object 34. For example, a first probability 64 of first object 30 and a second probability 66 of second object 32 are shown in FIG. 6 as an output 62 of the machine learning model 54. The method 200 may include determining whether the target object 34 was correctly identified based on subsequent user input 68 and updating the machine learning model 54 based on the subsequent user input 68.

One potential advantage of the computing system 10 is that a target object 34 to receive a command 16 of a user may be determined distinctly from the determination of the command 16 itself. Although these processes need not be unrelated, by accounting for the contribution of non-semantic inputs such as vocal volume, hand shape, controller direction, and the like, the system 10 may process identification of the target object 34 relatively separately from the command 16. The system 10, therefore, may be more efficient in processing. Also, the system 10 may provide a richer experience for a user by engaging with the user not only on the level of command interpretation but by additionally receiving other user input and responding to a greater breadth of the user's communicative expressions. Inferring the user's intent in a more accurate manner using the system and methods described above may decrease the need for the user to enter disambiguation input, and also may decrease erroneous command executions, thereby resulting in a more satisfying user experience.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
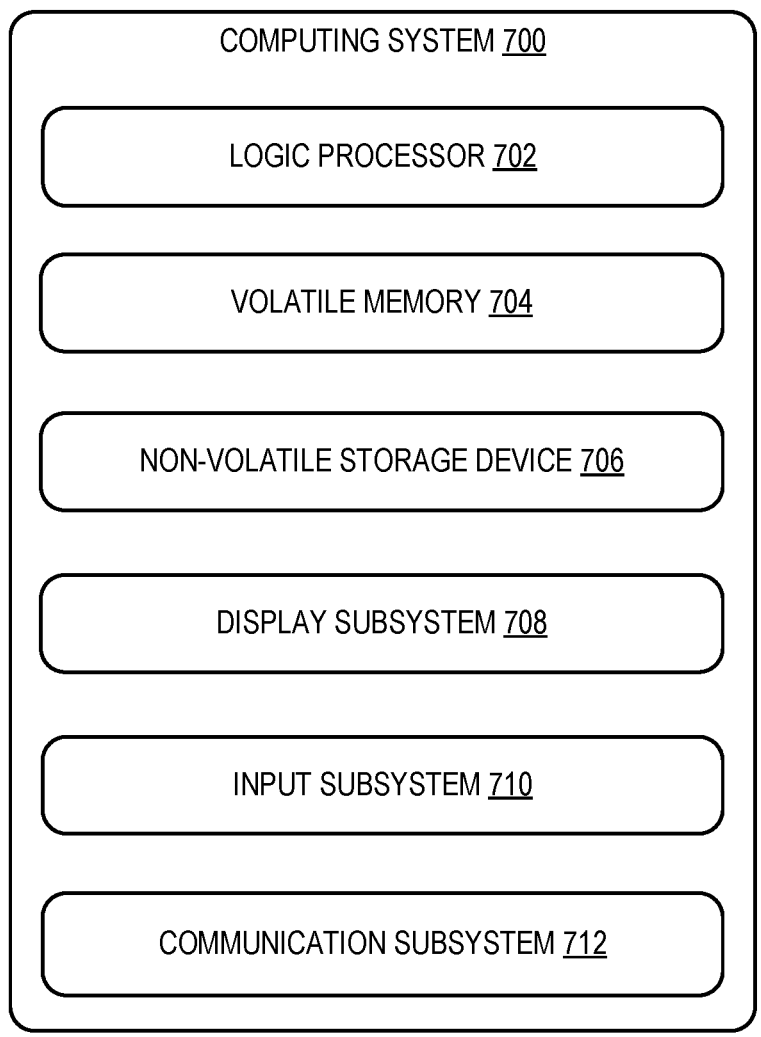
FIG. 8 is an example computing system according to an implementation of the present description.

FIG. 8 schematically shows a non-limiting embodiment of a computing system 700 that can enact one or more of the methods and processes described above. Computing system 700 is shown in simplified form. Computing system 700 may embody the computing device described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 8.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (hardware) configured to execute software instructions. Additionally or alternatively, the logic processor 702 may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor 702 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem 710 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem 712 may allow computing system 700 to send and/or receive messages to and/or from other devices via a network such as the Internet.

The following paragraphs provide additional support for the claims of the subject application. One aspect provides a method for use with a computing device, comprising, at a processor of a display device, receiving a voice command from a user and receiving a first auxiliary input from the user from a first sensor and a second auxiliary input from the user from a second sensor. The method further comprises, at the processor, determining a first set of probability factors for each of a plurality of objects in the user's field of view in an environment with respect to the first auxiliary input from the user and a second set of probability factors for each of the plurality of objects with respect to the second auxiliary input from the user, each probability factor in the first and second sets indicating a likelihood that respective auxiliary inputs are directed to a respective one of the plurality of objects. The method further comprises, at the processor, determining a target object from among the plurality of objects based upon the probability factors of the first and second auxiliary inputs and executing the command on the target object.

In this aspect, additionally or alternatively, determining the target object may include computing a probability score for each of the plurality of objects by multiplying a respective first probability factor by a respective second probability factor and choosing an object with a highest probability score as the target object from among the plurality of objects. In this aspect, additionally or alternatively, the object with the highest probability score may be chosen as the target object when the highest probability score is above a predetermined confidence threshold above which the voice command is deemed to be sufficiently associated with an object for identification as the target object. In this aspect, additionally or alternatively, determining the target object may further include, when the highest probability score is below the predetermined confidence threshold, querying the user for a disambiguation input indicating the target object.

In this aspect, additionally or alternatively, each of the first auxiliary input and the second auxiliary input may include one or more of a non-semantic input of the command, a pose of the user, a gesture of the user, a gaze direction of the user, and a controller input of a controller operated by the user. In this aspect, additionally or alternatively, each of the first and second probability factors may be determined from weights assigned to each auxiliary input type prior to receiving the voice command from the user, the weights assigned by at least one method selected from the group consisting of calculating weights based on experimental data from a sample of users, assigning weights heuristically, and training a machine learning model on a training data set. In this aspect, additionally or alternatively, training the machine learning model on the training data set to determine weights may be executed in a training phase prior to receiving the voice command from the user, and the training data set may include paired input-output data, including auxiliary inputs and voice command inputs paired with user selected target objects.

In this aspect, additionally or alternatively, the method may further comprise receiving the voice command, first and second auxiliary inputs, determining the first and second set of probability factors, and determining the target object occurring during a run-time phase; determining the first and second sets of probability factors may include inputting the first and second auxiliary inputs, respectively, into the trained machine learning model and determining the target object may include reading an output of the trained machine learning model that indicates a probability for each of the plurality of objects for identification of the target object. The method may further comprise, at the processor, determining whether the target object was correctly identified based on subsequent user input and updating the machine leaning model based on the subsequent user input.

In this aspect, additionally or alternatively, the target object may be a virtual object or real object. In this aspect, additionally or alternatively, the method may further comprise, at the processor, prioritizing each of the first and second auxiliary inputs from the user according to a context associated with the environment.

Another aspect provides a computing system comprising a processor of a display device configured to execute one or more programs, the processor configured to receive a voice command from a user and receive a first auxiliary input from the user from a first sensor and a second auxiliary input from the user from a second sensor. The processor is further configured to determine a first set of probability factors for each of a plurality of objects in the user's field of view in an environment with respect to the first auxiliary input from the user and a second set of probability factors for each of the plurality of objects with respect to the second auxiliary input from the user, each probability factor in the first and second sets indicating a likelihood that respective auxiliary inputs are directed to a respective one of the plurality of objects. The processor is further configured to determine a target object from among the plurality of objects based upon the probability factors of the first and second auxiliary inputs and execute the command on the target object.

In this aspect, additionally or alternatively, determining the target object may include computing a probability score for each of the plurality of objects by multiplying a respective first probability factor by a respective second probability factor and choosing an object with a highest probability score as the target object from among the plurality of objects. In this aspect, additionally or alternatively, the object with the highest probability score may be chosen as the target object when the highest probability score is above a predetermined confidence threshold above which the voice command is deemed to be sufficiently associated with an object for identification as the target object. In this aspect, additionally or alternatively, determining the target object may further include the processor configured to, when the highest probability score is below the predetermined confidence threshold, query the user for a disambiguation input indicating the target object.

In this aspect, additionally or alternatively, each of the first auxiliary input and the second auxiliary input may include one or more of a non-semantic input of the command, a pose of the user, a gesture of the user, a gaze direction of the user, and a controller input of a controller operated by the user. In this aspect, additionally or alternatively, each of the first and second probability factors may be determined from weights assigned to each auxiliary input type prior to receiving the voice command from the user, weights assigned by at least one method selected from the group consisting of weighting experimental data from a sample of users, heuristic assignment of weights, and training a machine learning model on a training data set to determine weights.

In this aspect, additionally or alternatively, training the machine learning model on a training data set to determine weights may be executed in a training phase prior to receiving the voice command from the user, the training data set may include paired input-output data, including auxiliary inputs and voice command inputs paired with user selected target objects, and receiving the voice command, first and second auxiliary inputs, determining the first and second set of probability factors, and determining the target object may occur during a run-time phase. Determining the first and second sets of probability factors may include inputting the first and second auxiliary inputs, respectively, into the trained machine learning model, and determining the target object may include reading an output of the trained machine learning model that indicates a probability for each of the plurality of objects for identification of the target object. The processor may be further configured to determine whether the target object was correctly identified based on subsequent user input and update the machine learning model based on the subsequent user input.

In this aspect, additionally or alternatively, the target object may be a virtual object or real object. In this aspect, additionally or alternatively, the processor may be further configured to prioritize each of the first and second auxiliary inputs from the user according to a context associated with the environment.

Another aspect provides a method for use with a computing device, comprising, at a processor of a display device, receiving a voice command from a user and receiving a first auxiliary input from the user from a first sensor and a second auxiliary input from the user from a second sensor. The method further comprises, at the processor, determining a first set of probability factors for each of a plurality of objects in the user's field of view in an environment with respect to the first auxiliary input from the user and a second set of probability factors for each of the plurality of objects with respect to the second auxiliary input from the user, each probability factor in the first and second sets indicating a likelihood that respective auxiliary inputs are directed to a respective one of the plurality of objects. The method further comprises, at the processor, computing a probability score for each of the plurality of objects by multiplying a respective first probability factor by a respective second probability factor and determining a target object from among the plurality of objects by choosing an object with a highest probability score as the target object when the highest probability score is above a predetermined confidence threshold above which the voice command is deemed to be sufficiently associated with an object for identification as the target object.

The method further comprises, at the processor, when the highest probability score is below the predetermined confidence threshold, querying the user for a disambiguation input indicating the target object, and executing the command on the target object. Each of the first auxiliary input and the second auxiliary input includes one or more of a non-semantic input of the command, a pose of the user, a gesture of the user, a gaze direction of the user, and a controller input of a controller operated by the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for use with a computing device, comprising:
at a processor of a display device:
receiving a voice command from a user;
receiving a first auxiliary input from the user from a first sensor and a second auxiliary input from the user from a second sensor;
determining a first set of probability factors for each of a plurality of objects in the user's field of view in an environment with respect to the first auxiliary input from the user and a second set of probability factors for each of the plurality of objects with respect to the second auxiliary input from the user, each probability factor in the first and second sets indicating a likelihood that respective auxiliary inputs are directed to a respective one of the plurality of objects;
determining a target object from among the plurality of objects based upon the probability factors of the first and second auxiliary inputs; and
executing the command on the target object.

2. The method of claim 1, wherein determining the target object includes:
computing a probability score for each of the plurality of objects by multiplying a respective first probability factor by a respective second probability factor; and
choosing an object with a highest probability score as the target object from among the plurality of objects.

3. The method of claim 2, wherein the object with the highest probability score is chosen as the target object when the highest probability score is above a predetermined confidence threshold above which the voice command is deemed to be sufficiently associated with an object for identification as the target object.

4. The method of claim 3, wherein determining the target object further includes, when the highest probability score is below the predetermined confidence threshold, querying the user for a disambiguation input indicating the target object.

5. The method of claim 1, wherein each of the first auxiliary input and the second auxiliary input includes one or more of a non-semantic input of the command, a pose of the user, a gesture of the user, a gaze direction of the user, and a controller input of a controller operated by the user.

6. The method of claim 1, wherein each of the first and second probability factors is determined from weights assigned to each auxiliary input type prior to receiving the voice command from the user, the weights assigned by at least one method selected from the group consisting of calculating weights based on experimental data from a sample of users, assigning weights heuristically, and training a machine learning model on a training data set.

7. The method of claim 6, wherein
training the machine learning model on the training data set to determine weights is executed in a training phase prior to receiving the voice command from the user, and
the training data set includes paired input-output data, including auxiliary inputs and voice command inputs paired with user selected target objects.

8. The method of claim 7, further comprising:
receiving the voice command, first and second auxiliary inputs, determining the first and second set of probability factors, and determining the target object occur during a run-time phase, wherein
determining the first and second sets of probability factors includes inputting the first and second auxiliary inputs, respectively, into the trained machine learning model, and
determining the target object includes reading an output of the trained machine learning model that indicates a probability for each of the plurality of objects for identification of the target object;
further comprising:
determining whether the target object was correctly identified based on subsequent user input; and
updating the machine learning model based on the subsequent user input.

9. The method of claim 1, wherein the target object is a virtual object or real object.

10. The method of claim 1, further comprising prioritizing each of the first and second auxiliary inputs from the user according to a context associated with the environment.

11. A computing system, comprising:
a processor of a display device configured to execute one or more programs, the processor configured to:
receive a voice command from a user;
receive a first auxiliary input from the user from a first sensor and a second auxiliary input from the user from a second sensor;
determine a first set of probability factors for each of a plurality of objects in the user's field of view in an environment with respect to the first auxiliary input from the user and a second set of probability factors for each of the plurality of objects with respect to the second auxiliary input from the user, each probability factor in the first and second sets indicating a likelihood that respective auxiliary inputs are directed to a respective one of the plurality of objects;
determine a target object from among the plurality of objects based upon the probability factors of the first and second auxiliary inputs; and
execute the command on the target object.

12. The system of claim 11, wherein determining the target object includes:
computing a probability score for each of the plurality of objects by multiplying a respective first probability factor by a respective second probability factor; and
choosing an object with a highest probability score as the target object from among the plurality of objects.

13. The system of claim 12, wherein the object with the highest probability score is chosen as the target object when the highest probability score is above a predetermined confidence threshold above which the voice command is deemed to be sufficiently associated with an object for identification as the target object.

14. The system of claim 13, wherein determining the target object further includes the processor configured to, when the highest probability score is below the predetermined confidence threshold, query the user for a disambiguation input indicating the target object.

15. The system of claim 11, wherein each of the first auxiliary input and the second auxiliary input includes one or more of a non-semantic input of the command, a pose of the user, a gesture of the user, a gaze direction of the user, and a controller input of a controller operated by the user.

16. The system of claim 11, wherein each of the first and second probability factors is determined from weights assigned to each auxiliary input type prior to receiving the voice command from the user, weights assigned by at least one method selected from the group consisting of weighting experimental data from a sample of users, heuristic assignment of weights, and training a machine learning model on a training data set to determine weights.

17. The system of claim 16, wherein training the machine learning model on a training data set to determine weights is executed in a training phase prior to receiving the voice command from the user,
the training data set includes paired input-output data, including auxiliary inputs and voice command inputs paired with user selected target objects, and
receiving the voice command, first and second auxiliary inputs, determining the first and second set of probability factors, and determining the target object occur during a run-time phase, wherein
determining the first and second sets of probability factors includes inputting the first and second auxiliary inputs, respectively, into the trained machine learning model, and
determining the target object includes reading an output of the trained machine learning model that indicates a probability for each of the plurality of objects for identification of the target object;
the processor further configured to:
determine whether the target object was correctly identified based on subsequent user input; and
update the machine learning model based on the subsequent user input.

18. The system of claim 11, wherein the target object is a virtual object or real object.

19. The system of claim 11, the processor further configured to prioritize each of the first and second auxiliary inputs from the user according to a context associated with the environment.

20. A method for use with a computing device, comprising:
at a processor of a display device:
receiving a voice command from a user;
receiving a first auxiliary input from the user from a first sensor and a second auxiliary input from the user from a second sensor;
determining a first set of probability factors for each of a plurality of objects in the user's field of view in an environment with respect to the first auxiliary input from the user and a second set of probability factors for each of the plurality of objects with respect to the second auxiliary input from the user, each probability factor in the first and second sets indicating a likelihood that respective auxiliary inputs are directed to a respective one of the plurality of objects;
computing a probability score for each of the plurality of objects by multiplying a respective first probability factor by a respective second probability factor;
determining a target object from among the plurality of objects by choosing an object with a highest probability score as the target object when the highest probability score is above a predetermined confidence threshold above which the voice command is deemed to be sufficiently associated with an object for identification as the target object;

when the highest probability score is below the predetermined confidence threshold, querying the user for a disambiguation input indicating the target object; and executing the command on the target object, wherein each of the first auxiliary input and the second auxiliary input includes one or more of a non-semantic input of the command, a pose of the user, a gesture of the user, a gaze direction of the user, and a controller input of a controller operated by the user.

* * * * *